Sept. 4, 1962  J. J. HILL  3,052,846
ELECTRICAL MEASURING INSTRUMENTS
Filed Oct. 28, 1958  3 Sheets—Sheet 1

INVENTOR
JOSEPH JAMES HILL
BY Cushman, Darby &
Cushman
ATTORNEYS

Sept. 4, 1962   J. J. HILL   3,052,846
ELECTRICAL MEASURING INSTRUMENTS
Filed Oct. 28, 1958   3 Sheets-Sheet 2

INVENTOR
JOSEPH JAMES HILL
BY Cushman, Darby & Cushman
ATTORNEYS 3,052,846
ELECTRICAL MEASURING INSTRUMENTS
Joseph James Hill, Ashford, England, assignor to National Research Development Corporation, London, England, a British corporation
Filed Oct. 28, 1958, Ser. No. 770,222
Claims priority, application Great Britain Nov. 4, 1957
13 Claims. (Cl. 324—106)

This invention relates to electrical measuring instruments such as ammeters, voltmeters and wattmeters and to thermal converters therefor. A thermal converter is a transducer in which the heat produced by a current in a conductor is converted into an E.M.F., and consists basically of a resistance element constituting a heater and a thermocouple arranged to be heated thereby.

Thermal converters are well known for their high degree of accuracy of response over a very wide frequency band, and for this reason are used in certain types of A.C. meter. Ideally, the output E.M.F. is proportional to the square of the heating current for all values of curent within the rated range of the heater. The relationship between output E.M.F. and heater current is, however, not found in practice to follow the ideal square law, and whilst the value of $n$ in the expression $e = ki^n$, where: $e$ and $i$ are the said E.M.F. and current, respectively, is commonly of the order of 1.95, variations within the range 1.5–2.4 have been detected. There may also be errors in response due to drift and an changes in ambient temperature, and such errors are unacceptable when very high degrees of accuracy and stability are required over a wide range of working conditions.

The present invention aims at reducing the errors normally encountered in thermal converters, and in particular at rendering practicable the construction of electrical measuring instruments having an accuracy within 0.1% over a frequency range of the order of 40 c.p.s. to 30 kc./s. or even higher. A further object of the invention is to render practicable the construction of a wattmeter for measuring power at frequencies from, say 40 to about 100 kc./s. to a precision accuracy as laid down in British Standards Specification No. 89/1954.

To this end, it is a main object of the invention to provide a thermal converter having a high degree of temperature compensation whereby the overall output E.M.F. is made proportional to the square of the heater current within the desired limits of accuracy.

Yet another object of the invention is to provide a thermal converter assembly in which residual errors including those arising from the presence, in the equation relating the temperature rise ($\theta_M$) of the mid point of a heater to the current (I) through the heater, of terms involving the fourth and sixth powers of the current are reduced to a minimum.

The invention also includes a measuring instrument or meter in which the sensing element, or one of them, may be a compensated thermal converter as described above. One such instrument is an A.C. wattmeter which operates on the principle of deriving the difference between the squares of the sum of and the difference between two currents proportional, respectively, to the load current and load voltage. It can be shown that this difference is directly proportional to A.C. power.

It is accordingly a still further object of the present invention to provide an A.C. wattmeter circuit in which equal positive and negative voltages, proportional in magnitude to the load current, are derived in the centre-tapped secondary of a voltage transformer, and are separately added to a voltage which is proportional to the load voltage. This arrangement enables an instrument of very high accuracy to be produced, especially when the sensing elements are compensated thermal converters according to the present invention.

It can be shown that, in a conventioal thermal converter comprising a straight heater wire stretched between end terminals and having a thermocouple located at its mid-point, the whole being mounted in an evacuated envelope, there are four main sources of error which cause the mid-point temperature rise to depart from a strict square law relationship to the current flowing in the heater. These are:

(a) the cooling effect of the thermocouple on the temperature of the mid-point of the heater;
(b) the temperature coefficient of resistivity of the heater material;
(c) the temperature coefficient of thermal conductivity of the heater material;
(d) radiation losses.

The net effect of these errors may be a departure from the square law relationship by as much as 20% at rated current. Errors due to (a) may be considerable in low current converters where the heater wire is thinner than the thermocouple wires. The error due to (b) is relatively unimportant for the materials commonly used for modern heaters. The error due to (c) is normally greatest for all converters except those having a very small current rating. The errors due to (d) result in a temperature coefficient of output E.M.F. which is a function of the heater current. The full expression relating the temperature rise to the current (I) involves terms in $I^2$ which are dependent on the factors (b), (c) and (d).

The temperature rise of the heater is only of importance insofar as it determines the output E.M.F. at the terminals of the thermocouple. The law relating this E.M.F. (E) to the temperature rise $\theta_M$ can be written, as an approximation, $$E = A\theta_M(1 + \gamma\theta_M)$$

where
A is usually 40–50 microvolts/°C., and
$\gamma$ ranges from $-2 \times 10^{-4}$ to $+11 \times 10^{-4}$ for materials commonly used.

E is dependent on ambient temperature, which is a factor in $\theta_M$, and in a typical thermal converter its value at rated current is usually in the range 6 to 8 millivolts, corresponding to a mid-point temperature rise in the heater of about 150° C. The effect of $\gamma$ on the output E.M.F. for this temperature rise is to vary the value of E from its linear relationship by amounts of up to 15%.

By substituting, in the above equation, the full expression relating $\theta_M$ to current, error terms in $I^4$ and $I^6$ appear, but their coefficients are numerically very small, and in general an accuracy of between 0.1% and 0.2% is obtainable if they are neglected.

Thermal converters having heater elements of the usual resistance alloys obey a law of the type:

$$E_1 = K_1 I^2 (1 - D_1 I^2)$$

where $D_1 I^2$ is the algebraic sum of all error terms in $I^2$.

Materials are also known which have a very large positive value for the temperature coefficient of resistivity, and this outweighs all other effects and results in a law of the type $$E_2 = K_2 I^2 (1 + D_2 I^2)$$

If, therefore, two thermal converters, one obeying each law, are connected in series, the combined output E.M.F. $E = E_1 + E_2$ is proportional to $I^2$ provided that $$K_1 D_1 = K_2 D_2$$

In practice it would be difficult to satisfy this requirement without careful construction and selection of matching pairs, but if one heater is shunted so that it carries only $1/n$ of the current through the other, the combined output E.M.F. is proportional to the square of the current provided that $$n = \sqrt[4]{\frac{K_2 D_2}{K_1 D_1}}$$

Such a value of $n$ can be approximately calculated from the known values of the constants involved, or by trial and error, and a practical means of compensation of standard thermal converters is possible.

Practical ways of carrying the present invention into effect will now be particularly described, by way of example only, with reference to the accompanying drawings in which.

The chief practical requirements of a compensating heater are that it should have a high resistivity and a large positive temperature coefficient of resistivity and must be capable of being drawn down to a very fine wire. Copper and silver satisfy only the second of these requirements, whilst platinum and nickel satisfy all three to a high degree, and rhodium and palladium are good alternatives. Other metals also may be found to have the required characteristics to a sufficient degree, but the following description is limited, for illustrative purposes, to the use of platinum and nickel for the compensating heaters.

Similarly, the only complete measuring instrument described hereinafter is a wattmeter, although it is to be understood that a compensated thermal converter may be used in a variety of instruments where an accurate square law response is needed, or where the purely resistive characteristic of the device is of importance. For example, a thermal converter may with advantage be used as an A.C./D.C. transfer standard for the precise measurement of current and voltage at power and audio frequencies. In such instruments, the criterion of performance is that the response characteristic $E = F(I)$ shall be the same on A.C. as on D.C., but no dependence is placed on the form of $F(I)$.

Figure 1:
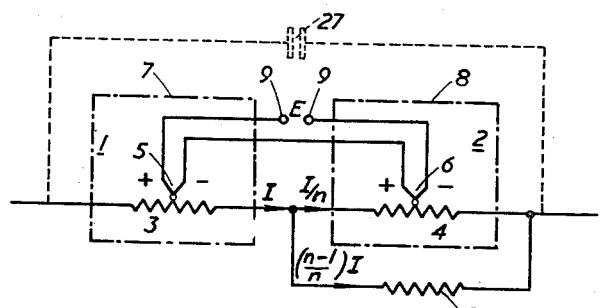
FIGURE 1 is a circuit diagram of a first form of compensated thermal converter.

FIGURE 1 shows the preferred circuit mentioned above for a compensated thermal converter according to the present invention. In this circuit, two thermal converters 1, 2 have their heaters 3, 4, respectively, connected in series. The heater 3 is of a conventional alloy having a low temperature coefficient of resistivity —for example, Nichrome—whilst the heater 4 is of pure nickel or platinum, and has a positive temperature coefficient of resistivity of the order of 100 times that of the other. A thermocouple 5, 6 is associated with each heater in the usual way, and each assembly is enclosed in an evacuated glass envelope indicated by dotted lines 7, 8, respectively. The thermocouples 5, 6 are electrically connected in series circulation to give a total output E at the terminals 9 which is the sum of the separate E.M.F.'s, as indicated by the polarity signs.

The pure metal heater 4 is shunted by a resistance 10 of such magnitude that the current through this heater is $$\frac{I}{n}$$

where $I$ is the current in the heater 3, and $n$ is as defined above. The shunt 10 is thermally insulated from the heater 3. The entire assembly of converters 1, 2 and shunt 10 may in turn be mounted in a common casing, or the shunt 10 may be located externally, or housed in an outer envelope which is permanently secured to the envelope 8.

Various compensated converters arranged as shown in FIGURE 1 were made and tested. First, four converters 2 having pure metal heaters 4—two of nickel and two of platinum—were made, one of each metal having a current rating of 25 ma. and the other a current rating of 35 ma. Under test, the output E.M.F. of each converter at rated current was found to be about 30% over the value calculated on the basis of ⅓ rated current and assuming a linear law between E.M.F. and $I^2$. Other converters 1 having alloy heaters 3, of either 10 ma. or 25 ma. current rating, were then connected in series with respective pure metal converters 2, and the correct value of shunt 10 was calculated for each combination of alloy and pure metal heaters. Six such combinations were tested, and in each case the total output E.M.F. departed from the calculated square law value by not more than 0.5% at rated current. Adjustment of the shunt 10 by trial and error reduced this departure to about ±0.1%. This residual error is due partly to the effects of the error terms in $I^4$ and $I^6$ in the equation for $\theta_M$, mentioned above, and partly to the change in shunting effect resulting from the increase in resistance of the pure metal heater 4 with current. In order to minimise this effect, the ratio of current in the shunt to heater current should be kept as low as practicable. Furthermore, the positive error in the E.M.F./current relationship for a pure metal heater is greater in magnitude than the negative error for an alloy heater, and hence it is desirable that the rating of the pure metal heater should be higher than that of the alloy heater. Experiments show that a ratio of 2:1 is satisfactory.

Figure 2:
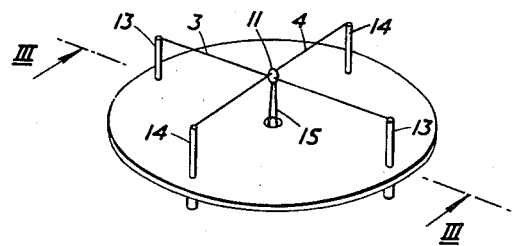
FIGURE 2 is a perspective view, without the envelope, of an alternative arrangement of heater and thermocouple components.
Figure 3:
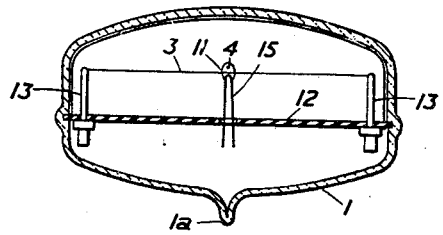
FIGURE 3 is a sectional elevation on the line III—III of FIGURE 2.

In the arrangement of FIGURE 1, two separate thermal E.M.F.'s are summed to give a resultant output E.M.F. FIGURES 2 and 3 show a variant construction in which the resultant temperature of the two heaters 3, 4 acts on a common thermocouple 15. The heater wires 3, 4, are stretched at right angles to each other, and in different planes between respective end pillars or terminals 13, 14 on a common insulating base 12. The midpoints of the heaters are mechanically joined by an insulating bead 11 into which is also embedded, in the standard fashion, the thermocouple hot junction 15. The whole assembly is housed in a single evacuated envelope 1 (FIGURE 3). The external connections to the heaters and thermocouple are taken through the usual "pinch" 1a, and the shunt 10 (not shown) may be externally mounted, or if preferred may be located within the envelope 1 on the side of the base 12 remote from the heaters 3, 4.

A compensated thermal converter arranged in accordance with the circuit of FIGURE 1 and having the heater 3 made of the alloy known as Nichrome and the heater 4 made of platinum had a temperature coefficient of output E.M.F. (E) less than 0.03% per ° C. The converter was tested in air at 20° C.±2° C. intervals throughout a period exceeding a year, and no change in calibration in excess of 0.1% was observed.

Figure 4:
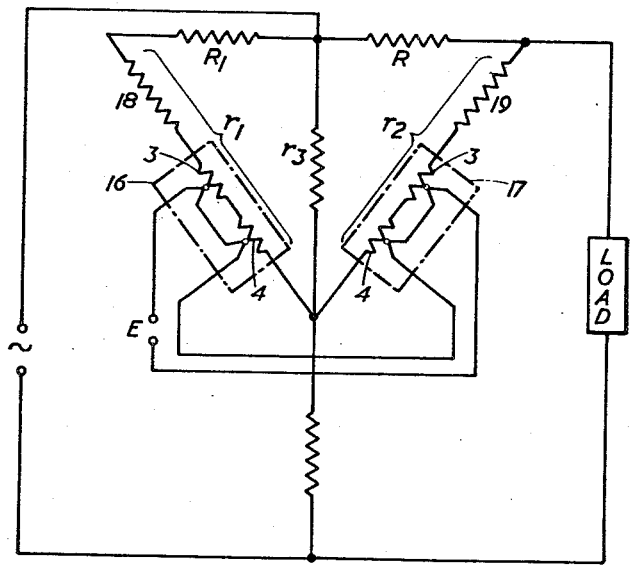
FIGURE 4 is a diagram of a generally known form of wattmeter circuit embodying compensated thermal converters as shown in FIGURE 1.

A wattmeter, designed to have a full load rating of 1 ampere at 100 volts, was built using the modified Bruckman circuit shown in FIGURE 4 with two compensated thermal converters 16, 17. In order to reduce the errors which can arise in this type of circuit from changes of heater resistance with current, swamp resistances 18, 19 were connected in series with each compensated converter 16, 17. The calculated values of the principal circuit resistances were as follows:

$R = 2.0$ ohms
$R_1 + r_1 = 100$ ohms $= R + r_2$
$r = 4902$ ohms
$r_3 = 5002$ ohms Before connection of the compensated converters 16, 17 into the circuit, their output E.M.F.'s were measured on D.C. at 20.00 ma., and the mean values were found not to differ by more than 3 parts in $10^4$. This figure was used as a basis for calculating the errors of the wattmeter when measuring power in an A.C. circuit. The power in various non-inductive loads was then measured at 50 cycles/sec., and the errors tabulated as follows, in percentages of output E.M.F. at the value of power concerned:

| Load voltage volts | Approximate current, amps. | True watts | Wattmeter error, percent |
|---|---|---|---|
| 100 | 1.0 | 100.00 | +0.10 |
| 90 | 0.9 | 80.00 | −0.05 |
| 100 | 0.65 | 65.00 | 0.00 |
| 80 | 0.8 | 65.00 | 0.00 |
| 100 | 0.5 | 50.00 | +0.10 |
| 70 | 0.7 | 50.00 | +0.10 |
| 60 | 0.6 | 35.00 | +0.1 |
| 50 | 0.5 | 25.00 | +0.1 |

It will be seen that the errors for any condition between full and quarter load do not exceed 0.1% and also that the errors at constant watts are virtually independent of the relative values of current and voltage.

Satisfactory as this result is, the system has three drawbacks. Firstly, it has been necessary to increase the full load voltage drop across the main current shunt from about ¼ volt, which the converter 16 or 17 alone would require, to 2 volts to include the swamp resistance 18, 19 which was included to overcome the effects of the changes in the heater resistance of the converters. Whilst this power loss in the shunt R does not have to be allowed for in the measurement, a rather large insertion loss is nevertheless caused. Secondly the Bruckman circuit does not lend itself readily to multi-range operation since a large number of resistances have to be changed for each change of range. Finally the insertion loss due to the "voltage" circuit is large, 20 ma. in the present instance. This might be reduced to 10 ma. or even 5 ma., but converters of lower current than this are unsatisfactory, partly because the heater volt-drop at rated current increases as the rating is reduced below 10 ma., but mainly because their response is so slow.

Figure 5:
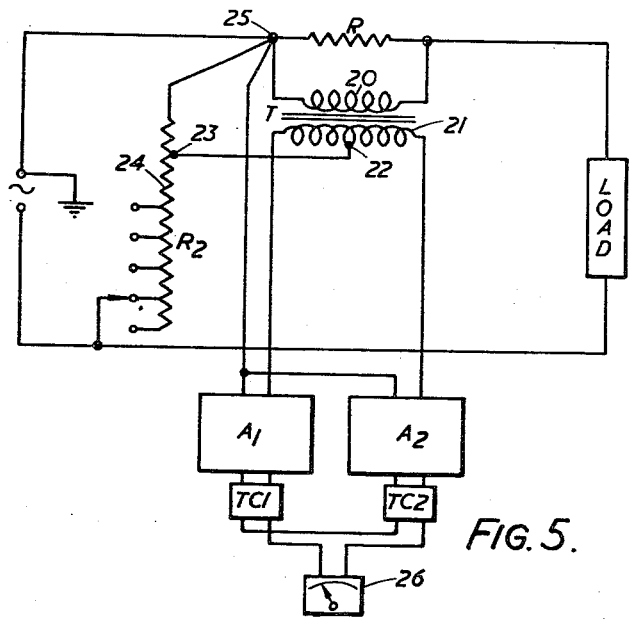
FIGURE 5 is a partly schematic diagram of a modified wattmeter circuit according to the present invention.

Accordingly, the circuit of FIGURE 5 was designed so that the voltage drop in the main current circuit would not exceed 0.1 volt, and the current consumption of the voltage circuit would be 0.2 or 1 milliamp. The required minimum current range was 0.1 amp. and the maximum voltage range was 500 volts. An accuracy over a frequency range from 50 c.p.s. to 30 kc./s. was to be comparable with that laid down in B.S.S. 89 for Precision Grade wattmeters. Satisfaction of the above requirements is necessary if the wattmeter is to be used for precise measurements, especially at low circuit power factors.

The circuit comprises a non-inductive four-terminal resistance R across which, at rated current, appears a voltage drop of 0.1 volt. This resistance is connected in series with the load, and across it is connected the primary 20 of a precision 1:10 voltage transformer T. The secondary 21 of this transformer is centre-tapped at 22, the centre tap being connected to a point 23 on a potential divider 24 connected across the load circuit, including the resistance R, so that, at rated load voltage, the points 22, 23 are at 0.5 volt above earth. Two voltage amplifiers $A_1$ and $A_2$ have their inputs connected to respective ends of the transformer secondary 21 and to the junction 25 of the resistance R and the potentional divider 24 so that their inputs are, respectively, the vector sum and the vector difference of the voltage across the appropriate half of the secondary 21 and the voltage between the points 23 and 25. The voltage across each half of the secondary is proportional to load current while the voltage between the points 23, 25 is proportional to load voltage.

The outputs of the amplifiers are, therefore, the vector sum and the vector difference, respectively, of two currents one of which is proportional to load current and the other to load voltage. These vector outputs are fed to respective square law detectors $TC_1$ and $TC_2$ which, in the particular instrument referred to, are constituted by compensated thermal converters according to FIGURE 1, each having a heater 3 of the nickel-chromium alloy Nichrome and a heater 4 of a pure metal connected in series. For experientmal purposes only, one of the pure metal heaters 4 is of platinum and the other of nickel, but it will be understood that normally the constructions of the compensated thermal convertors $TC_1$ and $TC_2$ will be identical. The outputs of these square law detectors are connected in opposition, through an indicating or recording instrument 26, so that the resultant E.M.F. is proportional to the power in the load plus the power losses in the resistance R and the transformer T.

When the compensated thermal converters were tested at 50 c.p.s., the heater current being maintained constant to 1 part in $10^4$ and the output E.M.F. measured with an uncertainty of $0.5\mu v$. or 2 parts in $10^4$, whichever was greater, the following results were obtained:

| Approx. heater current I, ma. | Approx. output e.m.f. E, $\mu v$. | Measured values of $E/17.920 \times I^2$ | |
|---|---|---|---|
| | | Ni-Cr+Pt | Ni-Cr+Ni |
| 7.5 | 1,000 | 1.0000 | 1.0000 |
| 10.5 | 2,000 | 1.0010 | 1.0010 |
| 13 | 3,000 | 1.0015 | 1.0010 |
| 15 | 4,000 | 1.0015 | 1.0010 |
| 16.5 | 5,000 | 1.0015 | 1.0010 |
| 19 | 6,500 | 1.0005 | 1.0000 |
| 20 | 7,000 | 1.0000 | 1.0000 |
| 21 | 8,000 | 0.9995 | 0.9995 |

| | | |
|---|---|---|
| Total heater circuit resistance. | 13 ohms. | 13 ohms. |
| Change in resistance at 20 ma. | +2.5% | +3.5%. |
| Temperature coefficient of output e.m.f. 20° C.-30° C. | +0.02% per 1° C. | <0.01% per 1° C. |

The response time for full output to become established after the application of current was approximately 5 seconds. This compares not unfavourably with the limits allowed by B.S. 89–1954 for the damping of indicating dynamometer wattmeters.

The output of each compensated thermal converter $TC_1$, $TC_2$ was measured at a heater current of 20 ma. at various frequencies ranging from 50 c.p.s. to 20 kc./s., and no change exceeding 2 parts in $10^4$ was observed.

Figure 6:
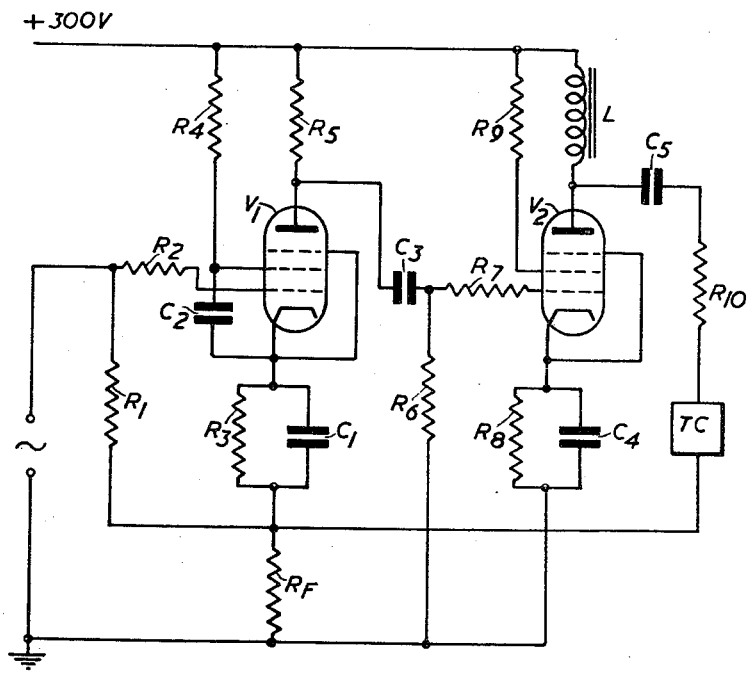
FIGURE 6 is a circuit diagram of an amplifier as used in FIGURE 5.

FIGURE 6 is a circuit diagram of an amplifier and detector. The component values are as follows:

| Resistors | | Capacitors | | |
|---|---|---|---|---|
| | $R_1$ 1MΩ | | $C_1$ | 100μf, 6v. |
| | $R_2$ 680Ω | | $C_2$ | 0.5μf, 350v. |
| | $R_3$ 380Ω | | $C_3$ | 2μf, 250v. |
| | $R_4$ 100KΩ | | $C_4$ | 500μf, 12v. |
| | $R_5$ 39KΩ | | $C_5$ | 32μf, 400v. |
| | $R_6$ 150KΩ | | | |
| | $R_7$ 680Ω | Inductance | L | 50H, 80 ma. |
| | $R_8$ 115Ω | | | |
| | $R_9$ 100Ω | Valves | $V_1$ | Type CV 138. |
| | $R_{10}$ 330Ω | | $V_2$ | Type CV 450. |
| | $R_F$ 50Ω | | | |

All resistors except $R_F$ are high-stability carbon. $R_F$ is non-inductive wire-wound.

The input voltage of the amplifier can be kept down to 1 volt. The stability margin at frequencies below the working range is good and the calculated maximum phase shift is 153° at about 1½ c.p.s. At frequencies above the working range, stability conditions are relatively favourable by virtue of the non-inductive loading of the resistive thermal converters $TC_1$ and $TC_2$.

The transformer T is required to have a maximum ratio error of 0.1% and a phase angle error of 3 minutes at any frequency in the range over which the wattmeter is to be used. Furthermore, the additional errors at the lowest frequencies due to the shunting of the resistance R by the primary 20 must not exceed 0.1% for ratio and 10 minutes for phase angle. These considerations lead to a minimum value of about 1 henry for primary inductance at 50 c.p.s., and since this requirement could lead, with available core materials, to excessive high frequency errors, it is preferred to use two transformers alternatively to cover the full frequency range. One of these has an inductance of 1 henry at 50 c.p.s. for use from 50 c.p.s. to 5 kc./s. and the other has an inductance of about 0.1 henry at 500 c.p.s. for use from 500 c.p.s. to 30 kc./s.

Each transformer is toroidally wound on a strip-wound core measuring 4 inches outside diameter and 3 inches inside diameter. The strip is of a nickel-iron alloy having a high initial permeability of the order of 30,000 at 50 c.p.s. and 10,000 at 10 kc./s., and is 0.75 inch wide and 0.005 inch thick. Each core is uniformly wound with primary windings calculated to give the required inductance. A gap of approximately ¾ inch is left unwound between the ends of the winding. In order to keep the resistance as low as possible, the primary winding is wound on the core first. Since the core provides an easy path for capacitance currents between turns which are not adjacent, and the effects of this are more serious on the high voltage secondary, the placing of the primary next the core has the added advantage of screening the secondary from the core.

The primary winding 20 is protected by an insulating layer of polythene tape 0.002 inch thick and wound with a 50% overlap. Over this is placed a fabricated annular box of polythene sheet 0.06 inch thick, this box being secured by a further overlapped layer of tape. The total layer thickness is about 0.07 inch thick. In the transformer used for the higher frequency range, the use of perforated sheet for the box is found to reduce the open-circuit inter-winding capacitance by about 20%. Whilst it is desirable to control the thickness of the inter-winding insulation so that the product of the leakage inductance and the inter-winding capacitance is kept to a minimum (see Proc. I.E.E., vol. 97, part II, No. 60, p. 797), it also appears necessary for wide frequency range response to make the admittance between windings as low as possible, and some compromise on insulation thickness may therefore be necessary.

The secondary winding 21 is wound as a single layer over the same part of the core as that occupied by the primary, the two halves of the secondary being accurately symmetrical with respect to the centre-tap 22. The secondary is covered by a final binding of 0.002 inch thick polythene tape. The characteristics of each transformer thus constructed are as follows:

|  | Transformer No. 1 | Transformer No. 2 |
| --- | --- | --- |
| Rating | 0.1/1 volt | 0.1/1 volt |
| Primary: |  |  |
| Wire | 4 x 0.022" enamelled in square formation. | 4 x 0.022" enamelled side by side. |
| Number of turns | 170 | 62. |
| D.-C. resistance | 0.23 ohm | 0.06 ohm. |
| Inductance | 1.0 henry at 50 c./s. | 0.12 henry at 500 c./s. |
| Secondary: |  |  |
| Wire | 0.0032" enamelled | 0.0108" enamelled. |
| Number of turns | 1700 C.T. | 620 C.T. |
| Total leakage inductance referred to primary. | 40μh. | 5μh. |
| Resonant frequencies | 150, 270 and 500 kc./s. | 450, 850 and 1500 kc./s. |

The ratio and phase angle of each transformer were measured at various frequencies in a bridge circuit by comparison with resistors having known A.C. characteristics up to 20 kc./s. One primary terminal of the transformer was connected to earth and no changes in value were observed when the primary and secondary connections to the circuit were reversed. The detector used was isolated from the circuit by means of a low admittance detector-transformer. The sensitivities of measurement were better than 1 part in $10^4$ and 0.5 minute for all conditions. The uncertainty in the values of time constant of the resistors was equivalent to an uncertainty of 2 minutes in the phase angle measurements at 20 kc./s. The results obtained with zero secondary burden were as follows:

| Primary voltage, volts | Test frequency, kc./s. | Transformer No. 1 | | Transformer No. 2 | |
| --- | --- | --- | --- | --- | --- |
|  |  | True ratio/ nominal ratio | Phase angle, mins. | True ratio/ nominal ratio | Phase angle, mins. |
| 0.10 | 0.05 | 1.0000 | +2 | 1.0002 | +7 |
| 0.05 | 0.05 | 1.0000 | +2 | 1.0002 | +7 |
| 0.025 | 0.05 | 1.0000 | +2 | 1.0002 | +8 |
| 0.10 | 0.1 | 1.0000 | +1 | 1.0002 | +4 |
| 0.10 | 0.2 | 1.0000 | +1 | 1.0001 | +2 |
| 0.10 | 0.5 | 1.0000 | 0 | 1.0001 | +1 |
| 0.10 | 1.0 | 1.0000 | 0 | 1.0001 | +1 |
| 0.10 | 2.0 | 1.0000 | 0 | 1.0001 | 0 |
| 0.10 | 5.0 | 1.0001 | +1 | 1.0000 | 0 |
| 0.10 | 10.0 | 1.0005 | +4 | 1.0001 | +1 |
| 0.10 | 15.0 | 1.0010 | +5 | 1.0002 | +2 |
| 0.10 | 20.0 | 1.0015 | +10 | 1.0002 | +3 |

It will be seen that transformer No. 1 complies with the specified limits of error for frequencies from 50 c./s. to about 10 kc./s. and transformer No. 2 complies for frequencies from about 100 c./s. to 20 kc./s. The overall errors which maintain when the transformers are used to measure current, ie., including the additional errors due to the primary shunting effects, were also measured and found to agree with calculation, being a maximum of 12 minutes of angle for a current range of 0.1 ampere at 50 c./s. with transformer No. 1 and at 500 c./s. with transformer No. 2.

A complete wattmeter arranged in accordance with FIGURES 5 and 6 and having the various components mounted in screened compartments in a metal box was tested, and the errors at full and half load, unity power factor, did not exceed 0.1% and the zero power factor error did not exceed 0.1% of full V.A. for these conditions in the frequency range 300 c./s. to 10 kc./s. Above 10 kc./s. however the errors increased approximately proportionally to the square of the frequency, reaching about 1% at 30 kc./s. In view of the very small individual errors of the various units comprising the wattmeter this result was somewhat unexpected. It was found that the error was due to the transformer. When forming part of the wattmeter the necessary connections alter the distribution of capacitances from that which applied to the transformer when tested as a separate unit. The input leads of the amplifiers also add additional capacitance between one primary terminal and each secondary terminal of the transformer. The error due to the latter effect was investigated by connecting capacitance between the primary 20 and secondary 21 and it was found that about 60 μμf. caused a change in error of 1% at 30 kc./s. The input capacitances of the amplifiers $A_1$, $A_2$ were reduced by using the minimum possible length of semi-air-spaced concentric cable, but even so the errors were still in excess of those required.

The desired high frequency performance was therefore obtained by a method of compensation. Capacitance was connected in parallel with the heaters of the compensated thermal converters, as indicated in dotted lines at 27 in FIGURE 1, to bypass the required amount of current. The effect of this bypassing was found to be negligible at frequencies below 10 kc./s. The results then obtained on the complete apparatus are given below, the values referring to rated voltage on any range.

Range 0.1 ampere using Transformer No. 1

| Current amperes | Circuit power factor | Error percent | | | | | | |
|---|---|---|---|---|---|---|---|---|
| | | 50 c./s. | 500 c./s. | 1 kc./s. | 5 kc./s. | 10 kc./s. | 20 kc./s. | 30 kc./s. |
| 0.10 | Unity | 0.0 | 0.0 | 0.0 | +0.2 | | | |
| 0.07 | ___do___ | 0.0 | 0.0 | 0.0 | +0.2 | | | |
| 0.05 | ___do___ | 0.0 | 0.0 | 0.0 | +0.2 | | | |
| 0.3 | ___do___ | 0.0 | 0.0 | 0.0 | +0.2 | | | |
| 0.10 | Zero lag | +0.3 | +0.1 | +0.1 | +0.2 | | | |
| 0.10 | Zero lead | −0.3 | −0.1 | −0.1 | −0.2 | | | |

Range 0.1 ampere using Transformer No. 2

| 0.10 | Unity | | 0.0 | 0.0 | 0.0 | 0.0 | 0.0 | +0.2 |
|---|---|---|---|---|---|---|---|---|
| 0.07 | ___do___ | | 0.0 | 0.0 | 0.0 | 0.0 | 0.0 | +0.2 |
| 0.05 | ___do___ | | 0.0 | 0.0 | 0.0 | 0.0 | 0.0 | +0.2 |
| 0.03 | ___do___ | | 0.0 | 0.0 | 0.0 | 0.0 | 0.0 | +0.2 |
| 0.10 | Zero lag | | +0.3 | 0.0 | −0.1 | −0.1 | −0.1 | −0.1 |
| 0.10 | Zero lead | | −0.3 | −0.1 | −0.2 | 0.0 | 0.0 | −0.1 |

The zero power factor errors at the lowest frequency of use for either transformer do not exceed 0.1% of rated V.A. for current ranges greater than 0.5 ampere.

The change in error due to a ±10% variation in the test voltage at a constant power was less than 0.1%.

From the foregoing, therefore, it will be seen that the invention provides simple means to compensate commercial thermal converters so that the net output E.M.F. is very closely proportional to the square of the heater current. The compensation leads to a reduction in the variation of output E.M.F. with changes in the ambient temperature. These improvements enable the excellent frequency characteristics of thermal converters to be used to good effect in the precise measurement of A.C. power over a very wide range of frequency. It has been found that the combined frequency response of a thermal converter and an amplifier is constant to better than 5 parts in $10^4$ from 40 cs./s. to 30 kc./s. The results of the wattmeter tests show that a compensated thermal converter according to the present invention can be used in an ammeter or voltmeter having errors not exceeding 0.1% over this frequency range.

In the circuit of FIGURE 5 the upper frequency limit for the accurate measurement of power is fixed by the performance of the voltage transformer. Above 10 kc./s. it has been necessary to provide a form of compensation (i.e. the capacitor 27 in FIGURE 1) in order to reduce the errors at 30 kc./s. to about ¼%. Whilst this compensation would be effective in keeping the errors reasonably small at still higher frequencies, an increasing dependence would be placed upon it, and further extension of the frequency range by this method is not recommended. The more satisfactory solution would be to use a low-admittance transformer designed for a minimum operating frequency of about 10 kc./s. and to dispense with the compensation altogether.

By using high permeability nickel-iron alloy strip 0.001 inch thick, cores have been made with an initial permeability greater than 20,000 at 50 kc./s., and the lowest resonant frequency of a transformer using such a core, and having a primary inductance of 10 mh. was found to be of the order of 5 mc./s. In order to reduce the admittance between the windings of the transformer T, it may be advisable to increase the thickness of insulation beyond that which gives the minimum product of capacitance and leakage inductance.

The frequency response of the thermal converters and the amplifiers is such that no difficulty is anticipated in using them up to a frequency of 100 kc./s. Unless suitable resistance wire of a diameter smaller than 0.0006" becomes available it would prove difficult to reduce the time constants of the voltage divider $R_2$ below their present values of 0.01 μh./ohm, and this would restrict the use of the wattmeter at frequencies above 30 kc./s. at low circuit power factors. However, recent experimental work with a 10 mh. transformer designed for use at 10 kc./s. and above has now enabled the accuracy of the wattmeter to be maintained without the necessity of the capacitance compensation across the thermal converters. The errors at unity power factor have thereby been reduced to 0.1% at 30 kc./s., 0.5% at 60 kc./s. and less than 1% at 100 kc./s. The restriction of use at low power factors at these upper frequencies still applies.

I claim:

1. A thermal converter of the type wherein a means which produces an output E.M.F. as a function of its temperature is energized by heater means carrying a current to be measured and to which the output E.M.F. is required to be proportional, comprising said E.M.F. producing means, said heater means including a first heater and a second heater both thermally coupled to said E.M.F. producing means to cause respective aiding E.M.F.'s therein, the first heater being constructed of a material having a low temperature coefficient of resistivity, the second heater being constructed of a material having a temperature coefficient of resistivity which is positive and of substantially greater magnitude than that of said first heater, the second heater being connected in series with said first heater in a circuit carrying the said current to be measured by said output E.M.F., and a shunt circuit path connected across said second heater and having an impedance value for causing the resultant output E.M.F. to be proportional to the square of the said current, which flows through said first heater and through the parallel circuit formed by said second heater and shunt circuit path, to within the desired limits of accuracy.

2. A thermal converter according to claim 1 in which the magnitude of the temperature coefficient of resistivity of said second heater is greater than the temperature coefficient of resistivity of said first heater by a factor of the order of 100.

3. A thermal converter according to claim 1 in which the current rating of said second heater is of the order of twice the current rating of said first heater.

4. A thermal converter according to claim 1 wherein said second heater is of a pure metal having a high resistivity and which is capable of being drawn to a fine wire.

5. A thermal converter according to claim 4 wherein the metal of said second heater is selected from the group comprising platinum, nickel, rhodium and palladium.

6. An electrical measuring instrument including a pair of thermal converters each according to claim 1, said instrument further comprising means for deriving a first current proportional to the current in an external load circuit, means for deriving a second current proportional to the voltage across said external load, means for deriving two vector output currents proportional respectively to the vector sum and vector difference of said first and second currents, means for feeding each of said vector output currents to a respective one of said thermal converters so as to derive an E.M.F. proportional to the square of said vector sum or of said vector difference, respectively, and a meter fed by the outputs of said converters connected in opposition whereby said meter is responsive to the algebraic difference between said outputs.

7. A thermal converter of the kind in which a thermocouple means is energized by a heater carrying a current to be measured and to the square of which the output E.M.F. of said thermocouple is required to be proportional comprising said thermocouple means; said heater comprising a first heater element having a low temperature coefficient of resistivity, and a second heater element connected in series with said first heater element and of a material having a positive temperature coefficient of resistivity which is of substantially greater magnitude than that of said first heater element, and a shunt resistance connected across said second heater element and of a value such that the ratio ($n$) of the amount of current through said first heater element to that through said second heater element is given at least approximately by the expression $$n = \sqrt[4]{\frac{K_2 D_2}{K_1 D_1}}$$

where $K_1 D_1$ and $K_2 D_2$ are coefficients of the error terms in $I^2$ appearing in the respective laws relating thermocouple output E.M.F. (E) and heater current (I) for the two heater elements, said laws being of the type $$E_1 = K_1 I^2 (1 - D_1 I^2)$$

for said first heater element and $$E_2 = K_2 I^2 (1 + D_2 I^2)$$

for said second heater element the terms $D_1 I^2$ and $D_2 I^2$ being the respective algebraic sums of all the error terms in $I^2$.

8. A thermal converter according to claim 7 in which the magnitude of the temperature coefficient of resistivity of said second heater is greater than the temperature coefficient of resistivity of said first heater by a factor of the order of 100.

9. A thermal converter according to claim 7 in which the current rating of said second heater is of the order of twice the current rating of said first heater.

10. A thermal converter according to claim 7 in which said thermocouple means comprises two individual thermocouples each in thermal contact with a respective one of said heater elements.

11. A thermal converter according to claim 7 in which said thermocouple means is a single thermocouple in thermal contact with both said heaters.

12. A thermal converter according to claim 11 in which said two heater elements are positioned to cross over each other and said single thermocouple is located at the position of cross-over.

13. An electrical measuring instrument including a pair of thermal converters each according to claim 7, said instrument further comprising means for deriving a first current proportional to the current in an external load circuit, means for deriving a second current proportional to the voltage across said external load, means for deriving two vector output currents proportional respectively to the vector sum and vector difference of said first and second currents, means for feeding each of said vector output currents to a respective one of said thermal converters so as to derive an E.M.F. proportional to the square of said vector sum or of said vector difference, respectively, and a meter fed by the outputs of said converters connected in opposition whereby said meter is responsive to the algebraic difference between said outputs.

References Cited in the file of this patent

UNITED STATES PATENTS

| 1,765,563 | Borden | June 24, 1930 |
| 2,283,566 | Miller | May 19, 1942 |
| 2,284,547 | West | May 26, 1942 |
| 2,444,027 | Becker | June 29, 1948 |
| 2,577,111 | Downing | Dec. 4, 1951 |
| 2,850,698 | Pihl | Sept. 2, 1958 |
| 2,866,159 | Deer | Dec. 23, 1958 |

FOREIGN PATENTS

| 216,338 | Great Britain | May 29, 1924 |
| 834,436 | France | Nov. 21, 1938 |
| 520,976 | Great Britain | May 8, 1940 |

OTHER REFERENCES

Publication, "A Thermocouple A. F. Wattmeter," pp. 6, 7, and 20 of Radio-Electronic Engineering Magazine, Fig. 1953.